United States Patent
Kiefer

(10) Patent No.: US 6,833,630 B2
(45) Date of Patent: Dec. 21, 2004

(54) METHOD OF OPERATING AN INTERNAL COMBUSTION POWERED VEHICLE GENERATOR WITH TIME DELAYED LOAD ENERGIZING

(75) Inventor: Wolf Kiefer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/117,139

(22) Filed: Apr. 8, 2002

(65) Prior Publication Data

US 2002/0145286 A1 Oct. 10, 2002

(30) Foreign Application Priority Data

Apr. 6, 2001 (DE) .......................................... 101 17 129

(51) Int. Cl.[7] .............................................. F02N 11/00
(52) U.S. Cl. ............................................ 290/34; 290/31
(58) Field of Search ................................ 290/7, 31, 34

(56) References Cited

U.S. PATENT DOCUMENTS

| | | | | |
|---|---|---|---|---|
| 3,544,803 A | * | 12/1970 | Taylor ........................ 307/10.1 |
| 3,564,280 A | * | 2/1971 | Sognefest et al. .......... 307/155 |
| 3,594,642 A | * | 7/1971 | Wright ........................ 324/772 |
| 3,648,057 A | * | 3/1972 | Sognefest et al. ......... 307/10.1 |
| 3,654,426 A | * | 4/1972 | Brinkmann et al. ........ 219/209 |
| 3,701,101 A | * | 10/1972 | Heiz et al. ............. 340/825.53 |
| 3,757,292 A | * | 9/1973 | Sato et al. ................... 280/735 |
| 3,804,986 A | * | 4/1974 | Wakamatsu et al. ........ 370/442 |
| 3,943,489 A | * | 3/1976 | Brewster et al. ....... 340/825.26 |
| 3,944,981 A | * | 3/1976 | Akita et al. ............ 340/825.21 |
| 3,952,286 A | * | 4/1976 | Wakamatsu et al. ....... 340/3.42 |
| 3,965,366 A | * | 6/1976 | Sumida et al. ................ 307/39 |
| 4,085,403 A | * | 4/1978 | Meier et al. ................. 340/3.2 |
| 4,097,752 A | * | 6/1978 | Wulf et al. .................... 290/20 |
| 4,122,996 A | * | 10/1978 | Wilczek ....................... 714/46 |
| 5,285,344 A | | 2/1994 | Heitzmann .................... 361/22 |
| 5,343,970 A | * | 9/1994 | Severinsky ................. 180/65.2 |
| 5,587,647 A | * | 12/1996 | Bansal et al. .................. 322/45 |
| 6,018,199 A | * | 1/2000 | Shiroyama et al. ........ 290/37 A |
| 6,154,381 A | * | 11/2000 | Kajouke et al. .............. 363/65 |
| 6,166,934 A | * | 12/2000 | Kajouke et al. .............. 363/65 |
| 6,240,890 B1 | * | 6/2001 | Abthoff et al. ........... 123/179.3 |
| 6,555,927 B1 | * | 4/2003 | Suzuki et al. ................. 290/34 |
| 6,593,671 B1 | * | 7/2003 | Schell ........................... 307/87 |
| 6,664,651 B1 | * | 12/2003 | Breida et al. ................. 290/29 |
| 6,674,180 B2 | * | 1/2004 | Gale et al. ...................... 290/7 |
| 6,724,099 B2 | * | 4/2004 | Klaar ............................ 290/52 |
| 6,769,389 B2 | * | 8/2004 | Tamai et al. ............. 123/179.3 |

FOREIGN PATENT DOCUMENTS

| | | |
|---|---|---|
| DE | 4039404 | 2/1994 |
| DE | 19907852 | 8/2000 |

OTHER PUBLICATIONS

European Search Report dated Mar. 1, 2004.

* cited by examiner

*Primary Examiner*—Joseph Waks
*Assistant Examiner*—Pedro J. Cuevas
(74) *Attorney, Agent, or Firm*—Crowell & Moring LLP

(57) ABSTRACT

A method of operating a generator in a vehicle is provided, which generator is driven by an internal-combustion engine and supplies energy to a vehicle wiring system. For improving vehicle emissions, particularly after a cold start of the internal-combustion engine, the generator is not operated immediately after the starting operation but is operated only after a defined time period such that it supplies energy to the vehicle wiring system.

24 Claims, 1 Drawing Sheet

METHOD OF OPERATING AN INTERNAL COMBUSTION POWERED VEHICLE GENERATOR WITH TIME DELAYED LOAD ENERGIZING

BACKGROUND AND SUMMARY OF THE INVENTION

This application claims the priority of German Application No. 101 17 129.3, filed Apr. 6, 2001, the disclosure of which is expressly incorporated by reference herein.

The invention relates to a method of operating a generator for a vehicle, which generator is driven by an internal-combustion engine and supplies its energy to a vehicle wiring system.

In the case of conventional motor vehicles with internal-combustion engines, a current-generating generator is usually provided. The generator ensures a current supply to the electrical systems of the vehicle together with a storage battery. The generator is usually connected immediately after starting the internal-combustion engine in a ramp-shaped manner, that is, with an increasing load. The generator generates electric power which will be called upon as a function of the demand. It also charges a run-down storage battery.

However, particularly during a cold start of an internal-combustion engine, high emission values occur in the first operating phase of the internal-combustion engine, which high emission values are worsened by an immediate connection of the generator after the start of the internal-combustion engine. In the case of a known engine, when a battery is essentially completely charged, a generator supplies, for example, 1.5 kw of power. When the battery is in a poorly charged condition, or it is very aged, loads of up to 2.75 kw may occur.

It is an object of the present invention to improve the emission behavior of an internal-combustion engine shortly after its start.

This object is achieved by a method of operating a generator in a vehicle, which generator is driven by an internal-combustion engine and supplies its energy to a vehicle wiring system. The generator is operated immediately after the starting operation of the internal-combustion engine for a defined time period so as not to supply energy to the vehicle wiring system.

It is an important idea of the present invention to not additionally burden the internal-combustion engine with partially high generator outputs shortly after its starting. For this purpose, the generator is operated such that, for a defined time after the starting operation, it supplies essentially no energy to the electrical wiring.

According to a first embodiment of the invention, the generator is electrically connected and, therefore, connected with the existing electrical vehicle wiring only after a defined time period. According to an alternative embodiment, a generator voltage, which is below the vehicle voltage, is generated in the first time period.

Finally, in another embodiment, a mechanical uncoupling of the generator from the internal-combustion engine may occur during the first time period, so that the generator is no longer driven at all. Although, by means of this approach, the frictional losses in the generator can also be avoided, increased constructive expenditures must be accepted to perform the uncoupling.

The above-mentioned first time period for the uncoupling may be firmly defined or freely selectable. If the time period is selectable, it may be selected, for example, as a function of vehicle operating conditions, such as exhaust gas data. If it is firmly defined, the generator may be deactivated, for example, for 10 or 20 seconds after the start. Depending on the embodiment of the generator, it is possible that the electrical switching-off (uncoupling) actively takes place by way of a so-called BSD-interface at the generator itself.

In the case of an alternative embodiment, when the voltage produced by the generator is below the vehicle wiring voltage, electrical consuming devices load only the battery and not the generator. Furthermore, the battery is also not charged from the generator. Therefore, no excessive additional load results from the generator operation, so that the internal-combustion engine also does not have to supply any significant power to the generator. If the battery voltage breaks down because of an excessive loading by consuming devices, then the generator can be used as a "back-up", so that the voltage reduction takes place only to the level of the voltage generated by the generator at this point in time.

On the whole, by means of the above-mentioned approaches, the exhaust emission values in the starting range, particularly during the cold start of an internal-combustion engine, can be considerably improved.

Other objects, advantages and novel features of the present invention will become apparent from the following detailed description of the invention when considered in conjunction with the accompanying drawings.

DETAILED DESCRIPTION OF THE DRAWINGS

Figures 1, 2:
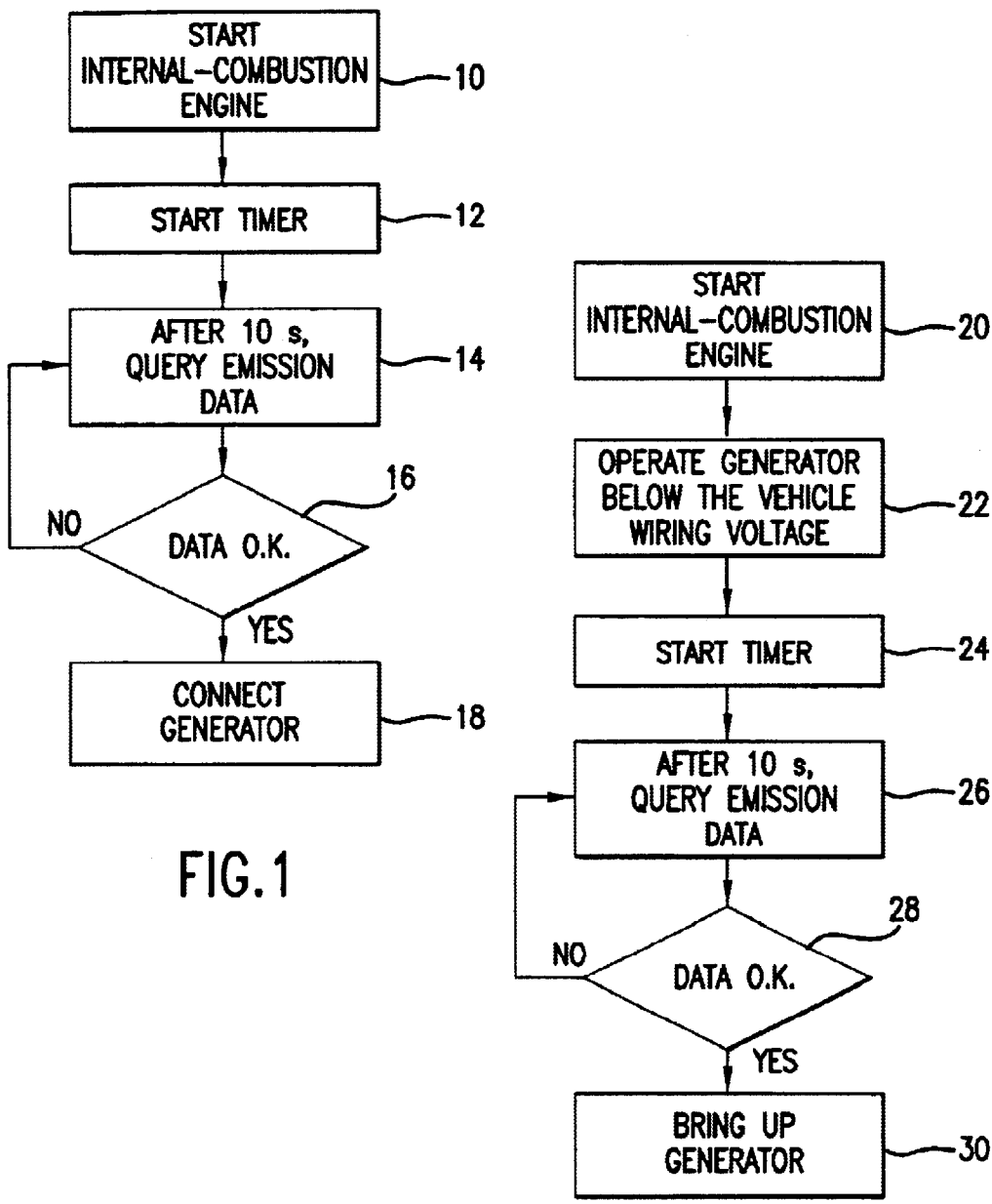
FIG. 1 is a flow chart of a first embodiment of the process according to the invention.
FIG. 2 is a flow chart of a second embodiment of the process according to the invention.

The method according to the invention requires no significant changes of the hardware in comparison to conventional systems. In a conventional manner, an internal-combustion engine can be electrically coupled or is electrically coupled with a generator. After being triggered, the generator delivers a corresponding electric power. In this context, so-called BSD interfaces are known on the generator, by which the latter can be controlled with respect to its power output. The generator may also be completely electrically separated from the vehicle wiring system so that it demands no significant power from the internal-combustion engine. It is mechanically coupled with the internal-combustion engine, however without the delivering of electric power—apart from the friction loss power.

In the first embodiment of the present method according to the invention, an internal-combustion engine is started in step 10. After the start of the internal-combustion engine, a timer is started in step 12. After 10 seconds, the emission data of the internal-combustion engine are queried and checked in step 14, and it is determined in step 16 whether the emission data are suitable such that the generator could be connected already at that time. If this is not the case (no), a branching back to step 14 takes place and the internal-combustion engine is operated another 10 seconds without electrically connecting the generator. This loop is performed until it is determined in step 16 that the emission data are suitable for the electric connection of the generator (yes). In this case, the generator is then connected in step 18 in a ramp-shaped manner.

The second embodiment according to FIG. 2 also begins with the start of the internal-combustion engine in step 20.

Immediately after the start of the internal-combustion engine, the generator is operated such that the generated voltage is below the vehicle wiring voltage (step 22). Simultaneously, a timer is started in step 24 and, after 10 seconds, the emission data are queried in step 26. If the emission data are not suitable for bringing-up the generator (no), a branching back to step 26 takes place in step 28. The internal-combustion engine will then be operated another 10 seconds during which the generator generates a voltage below the vehicle wiring voltage. This loop will be performed until it is determined in step 28 that the emission data are suitable for connecting the generator (yes). As soon as it is determined in step 28 that the emission data are suitable for bringing-up the generator, the generator output is brought-up in a ramp-shaped manner to its regular operating voltage.

The present invention avoids significant loading of the internal-combustion engine in the starting phase so that the emission values of the vehicle can be minimized in the critical starting phase.

The process of the present invention can be performed using software, hardware, or some combustion of both. Various implementations of the process can be developed without departing from the spirit and scope of the present claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a generator in a vehicle, which generator is driven by an internal-combustion engine of the vehicle and supplies its energy to a vehicle wiring system, the method comprising the acts of:
   starting an internal-combustion engine of the vehicle; and
   immediately after starting the internal-combustion engine, operating the generator for a defined time period so as not to supply energy to the vehicle wiring system.

2. The method according to claim 1, wherein the act of operating the generator during the defined time period is performed by maintaining a generator voltage produced by the generator below a normal vehicle wiring voltage.

3. The method according to claim 2, further comprising the act of bringing-up the generator voltage to the normal vehicle wiring voltage in a ramp-shaped manner after the defined time period.

4. The method according to claim 1, wherein the defined time period is variable.

5. The method according to claim 2, wherein the defined time period is variable.

6. The method according to claim 3, wherein the defined time period is variable.

7. The method according to claim 4, further comprising the act of selecting the defined time period as a function of vehicle operating parameters.

8. The method according to claim 5, further comprising the act of selecting the defined time period as a function of vehicle operating parameters.

9. The method according to claim 6, further comprising the act of selecting the defined time period as a function of vehicle operating parameters.

10. The method according to claim 1, wherein during the starting of the internal-combustion engine, the generator is or was previously electrically uncoupled from the vehicle wiring system; and
    wherein the generator is electrically coupled with the vehicle wiring system only after the defined time period elapses.

11. The method according to claim 10, wherein the electrical coupling of the generator with the vehicle wiring system so as to connect an exciter current is performed in a ramp-shaped manner.

12. The method according to claim 10, wherein the defined time period is variable.

13. The method according to claim 11, wherein the defined time period is variable.

14. The method according to claim 10, wherein the defined time period is selected as a function of vehicle operating parameters.

15. The method according to claim 11, wherein the defined time period is selected as a function of vehicle operating parameters.

16. The method according to claim 12, wherein the defined time period is selected as a function of vehicle operating parameters.

17. The method according to claim 10, further comprising the act of electrically uncoupling the generator from the vehicle wiring system immediately after starting the internal-combustion engine using a disconnect command.

18. The method according to claim 11, further comprising the act of electrically uncoupling the generator from the vehicle wiring system immediately after starting the internal-combustion engine using a disconnect command.

19. The method according to claim 12, further comprising the act of electrically uncoupling the generator from the vehicle wiring system immediately after starting the internal-combustion engine using a disconnect command.

20. The method according to claim 14, further comprising the act of electrically uncoupling the generator from the vehicle wiring system immediately after starting the internal-combustion engine using a disconnect command.

21. The method according to claim 1, further comprising the acts of:
    mechanically uncoupling the generator from the internal-combustion engine during the starting of the internal-combustion engine; and
    only after the defined time period elapses, coupling the generator with the internal-combustion engine with respect to a drive.

22. The method according to claim 21, wherein for performing the mechanical uncoupling between the internal-combustion engine and the generator, a series coupling is uncoupled.

23. The method according to claim 21, wherein the defined time period is selected as a function of the vehicle wiring voltage.

24. The method according to claim 22, wherein the defined time period is selected as a function of the vehicle wiring voltage.

* * * * *